Figure 1:
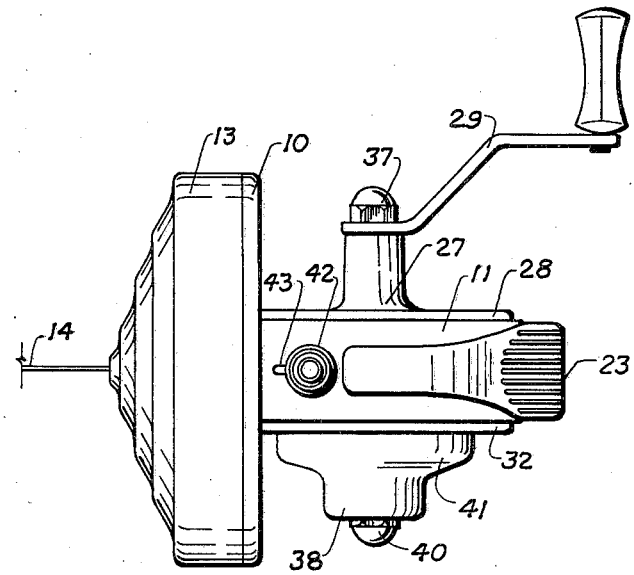

June 12, 1962  V. YEADA  3,038,682
THUMB-BRAKED SPINNING REEL
Filed Feb. 13, 1961  2 Sheets-Sheet 1

INVENTOR.
VICTOR YEADA
BY
ATTORNEY

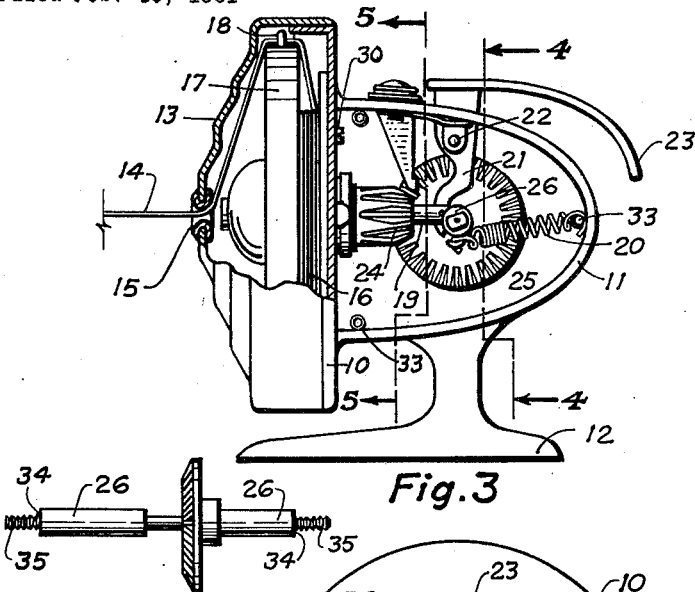
Fig. 3
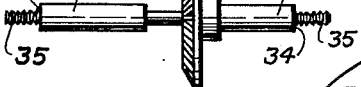
Fig. 6
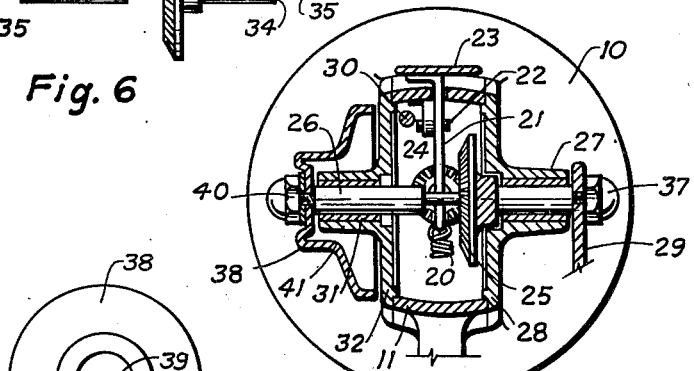
Fig. 4
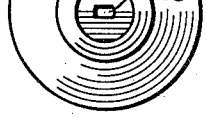
Fig. 7
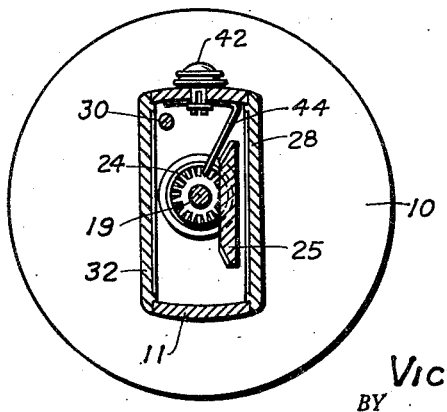
Fig. 8
Fig. 5

United States Patent Office 3,038,682
Patented June 12, 1962

3,038,682
THUMB-BRAKED SPINNING REEL
Victor Yeada, Denver, Colo., assignor to Wright & McGill Co., Denver, Colo., a corporation of Colorado
Filed Feb. 13, 1961, Ser. No. 88,969
4 Claims. (Cl. 242—84.2)

This invention relates to a fishing reel of the spinning type and more particularly to the fishing reel as illustrated and described in applicant's prior Patent No. 2,828,927, copending applications Serial No. 725,013, now Patent No. 2,989,266 and Serial No. 861,147.

The principal object of this invention is to simplify the driving and the braking or drag mechanisms of the usual spinning reel and to provide a reel in which all internal brakes or drags for resisting the outflow of the fishing line are eliminated and yet which will provide complete and accurate control of the outflowing line by simple manipulation of the fisherman's thumb.

A further object is to provide in a spinning type fishing reel, a drive shaft which will be provided with a hand crank at one extremity and a thumb drum at the other extremity so that a single shaft will act both to provide power for retrieving the fishing line and to provide resistance against withdrawment of the line when desired and to so construct the shaft that the hand crank and the thumb drum can be interchanged with each other to adapt the reel for use in either the right or left hand.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 2:
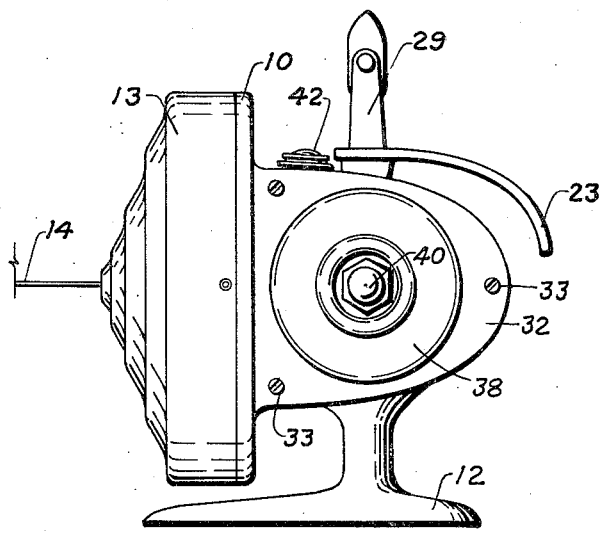

In the drawing:

FIG. 1 is a top view of the improved spinning reel;
FIG. 2 is a left side elevational view thereof;
FIG. 3 is also a left side elevational view thereof, partially broken away, showing the reel as it would appear with a left side plate removed therefrom to expose the interior mechanism;
FIG. 4 is a cross section taken on the line 4—4, FIG. 3;
FIG. 5 is a similar cross section taken on the line 5—5, FIG. 3;
FIG. 6 is a detail view of a crank shaft employed in the improved reel;
FIG. 7 is a detail face view of a thumb drum or bell employed on the improved reel; and
FIG. 8 is a similar face view of a hand crank used thereon.

The improved reel is assembled about and within a unitary die-casting which forms a circular backing plate 10, a hollow, D-shaped gear housing 11, and a rod foot 12. A spool hood 13 is mounted on the forward face of the backing plate 10 from which the fishing line, indicated at 14, axially extends through a grommet 15. The hood 13 covers a stationary line spool 16 upon which the line 14 is wound by means of a rotating, line-winding flyer 17 having a line winding pin 18 which can be released from the line when desired to allow the latter to be withdrawn axially from the spool by spinning peripherally about the flyer. The line-winding pin is withdrawn from the line through the medium of an axially movable plunger shaft 19 which, when forced forwardly, releases the winding pin 18 and which, when withdrawn rearwardly, engages the winding pin with the line flyer. The plunger shaft is withdrawn rearwardly by means of a tension spring 20 and is forced forwardly through the medium of a swinging lever 21 pivoted at 22 in the gear housing 11 and provided exteriorly of the housing with a thumb press lever 23. The flyer is rotated through the medium of a bevel pinion 24 which is driven from a bevel gear 25.

The bevel gear 25 is fixedly mounted on a crank shaft 26 projecting through a shaft bearing 27 in the right side plate 28 and terminating in a hand crank 29. Rotation of the hand crank forwardly first projects the winding pin 18 and then rotates the flyer 17 to wind the line 14 on the spool 16. Depression of the thumb press lever 23 withdraws the plunger shaft 18 and the latter retracts the winding pin 18 to allow the line to flow freely from the reel as it spins from the stationary spool 16 about the periphery of the stationary flyer 17.

All of the above elements are shown and described more fully in applicant's said copending applications and in applicant's prior Patent No. 2,828,927. This invention relates more particularly to means for eliminating all of the mechanical brakes and drag controls usually employed on the line spool 16 and for accomplishing more efficient results by holding the line spool against rotation and manually retarding rotation of the crank shaft 25.

This is accomplished by threading a stop screw 30 completely through the backing plate 10 so that it will engage the spool 16 to positively prevent rotation of the latter and extending the crank shaft completely across the gear housing 11 and through a second shaft bearing 31 in a left side plate 32. The side plates are identical and are clamped against the open sides of the gear housing by means of suitable clamp screws 33. The shaft bearings 27 and 31 are also identical so that the side plates are interchangeable. Each extremity of the crank shaft 26 is provided with a shoulder 34 positioned slightly outward beyond the outer extremity of the adjacent shaft bearing and a flat-sided threaded stud 35 projects concentrically outward from each shoulder.

The hand crank 29 is provided with a flat-sided opening 36 which can be fitted over the flat-sided stud 35 at either extremity of the crank shaft and locked in place against the shoulder 34 at that end by means of a first clamp nut 37. A hollow, somewhat conical, smooth surfaced thumb bell 38 is mounted on the other extremity of the crank shaft 26. The bell 38 is provided with a flat-sided axial opening 39 similar to the opening 36 in the crank, so that it also can be fitted over the flat-sided stud at either extremity of the crank shaft and clamped in place against the shoulder at that extremity by means of second clamp nut 40. Thus, the bell and the crank are freely interchangeable for right or left-handed users.

It is desired to call particular attention to the extreme simplicity and ease of use of the improved reel. Let us assume that a free spinning cast has been made with one hand with the winding pin 18 retracted to allow the line to freely spin about the periphery of the flyer 17. The line is retrieved at the completion of the cast by simply rotating the hand crank forwardly with the other hand to project the winding pin and rotate the flyer so as to wind the line about the stationary line spool 16.

When a fish strikes the lure, the pull of the line against the winding pin 18 will tend to rotate the flyer and the hand crank rearwardly. The crank can now be released and the outflow of the line can be controlled by simple frictional pressure of the thumb of the first or casting hand against the smooth surface of the thumb bell 38. It will be noted that the thumb bell 38 is provided with a smooth, rounded peripheral groove 41 in which the thumb may rest. Retrievement can be instigated at any time by simple forward rotation of the hand crank.

It is often desirable when "playing" a fish to have an audible signal to indicate that the reel is in the retrieve position and also to indicate line movement. This audible signal is provided in the present reel by mounting a sliding stud 42 in an elongated slot 43 in the top of the gear housing and mounting an inverted L-shaped resilient click spring 44 on the lower extremity of the stud, so positioned that when the stud is moved forwardly in its elongated slot 43, the lower extremity of the click spring 44 will contact and ride over the teeth of the bevel pinion 24 to produce a clicking sound.

It will be noted that when the thumb bell 38 is in place it extends inwardly into close proximity with the adjacent side plate so as to completely enclose the shaft bearing and the extremity of the crank shaft so as to prevent entanglement and interference.

While a specific form of the improvement has been described and illustrated herein, it is to be understood that the same may be varied within the scope of the appended claims, without departing from the spirit of the invention.

Having thus described the invention what is claimed and desired to be secured by Letters Patent is:

1. A fishing reel comprising: a gear housing; a side plate closing each side of said gear housing; a shaft bearing projecting outwardly from each side plate in axial alignment with each other; a spool backing plate formed on said gear housing; a line spool fixedly mounted on said backing plate; a flyer arranged to rotate concentrically about said line spool; a line winding pin projecting radially from said flyer to engage a fishing line and wind the latter on said stationary spool; a toothed bevel pinion in said gear housing connected with said flyer for rotating the latter; a crank shaft extending through both said shaft bearings and projecting oppositely outward from each; a bevel gear on said crank shaft engaging said bevel pinion; a hand crank mounted on one extremity of said crank shaft for rotating the latter; and a thumb bell fixedly mounted on the other extremity of said crank shaft and completely enclosing the projecting bearing to be engaged by the thumb of the fisherman for frictionally resisting rotation of said crank shaft.

2. A fishing reel as described in claim 1 in which the thumb bell comprises: a hollow, bell-shaped element having a closed top and an open skirt portion, said closed top being concentrically and fixedly secured on said other extremity of said crank shaft with said skirt portion extending toward and terminating in close proximity to one of said side plates so as to completely surround, enclose and conceal the outwardly, projecting shaft bearing at the side of said reel distant from said crank.

3. A fishing reel as described in claim 2 in which said thumb bell has a relatively small diameter portion adjacent said closed top surrounding the outer extremity of said outwardly projecting shaft bearing and a relatively large diameter portion adjacent said skirt, said portions being joined by an arcuately inclined joining portion against which the thumb of a user may be frictionally pressed to exert a braking action on said crank shaft.

4. In a fishing reel of the type having a crank shaft which when rotated forwardly will wind a line about a stationary line spool, means for imparting forward rotation to said crank shaft and for resisting rearward rotation thereof comprising: an outwardly extending bearing at each side of said reel, said crank shaft being mounted in said bearings and projecting similarly at both its extremities from said bearings, said extremities each being flat sided; a crank removably mounted on one flat-sided extremity; a hollow bell removably mounted on the other extremity of said crank shaft and completely and concentrically surrounding, enclosing and concealing the adjacent outwardly extending bearing so that forward rotation can be imparted to said crank shaft by rotating said crank forwardly and rearward rotation of said crank shaft can be resisted by thumb pressure against said bell, said bell and said crank being interchangeable for right or left hand use.

References Cited in the file of this patent

UNITED STATES PATENTS

| | | |
|---|---|---|
| 1,821,735 | Wharton | Sept. 1, 1931 |
| 2,613,468 | Hand | Oct. 14, 1952 |
| 2,668,025 | Hull | Feb. 2, 1954 |
| 2,918,049 | Stockfleth | Dec. 22, 1959 |
| 2,918,227 | Mauborgne | Dec. 22, 1959 |
| 2,929,578 | Hull | Mar. 22, 1960 |
| 2,988,298 | Purnell | June 13, 1961 |

FOREIGN PATENTS

| | | |
|---|---|---|
| 6,907 | Great Britain | of 1907 |
| 132,395 | Sweden | July 17, 1951 |
| 515,920 | Italy | Feb. 18, 1955 |
| 551,459 | Canada | Jan. 14, 1958 |